Aug. 19, 1930. W. E. LAPE 1,773,587
HYDRAULIC TRANSMISSION FOR MOTOR VEHICLES
Filed June 10, 1924     3 Sheets-Sheet 1
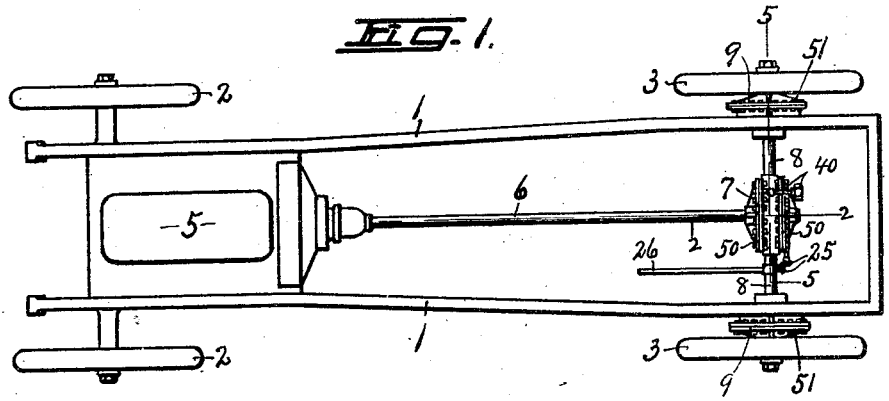
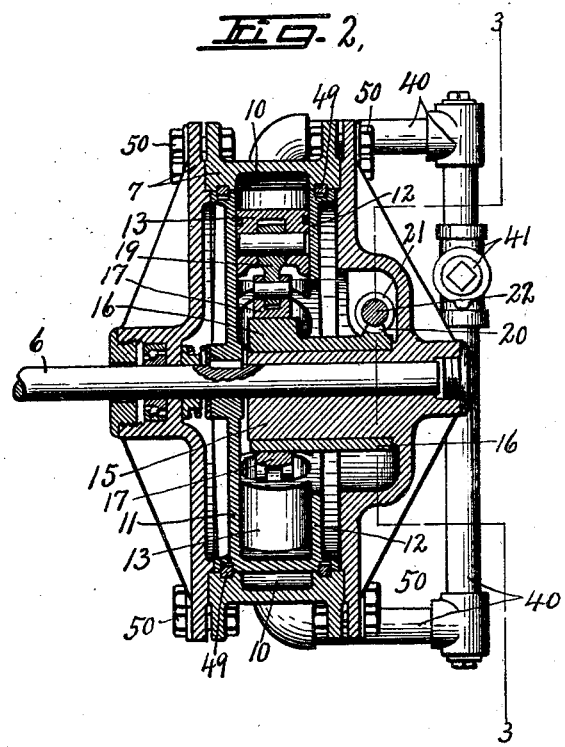

Aug. 19, 1930.  W. E. LAPE  1,773,587

HYDRAULIC TRANSMISSION FOR MOTOR VEHICLES

Filed June 10, 1924   3 Sheets-Sheet 2

WITNESS
INVENTOR
W. E. Lape
BY Denison + Thompson
ATTORNEYS

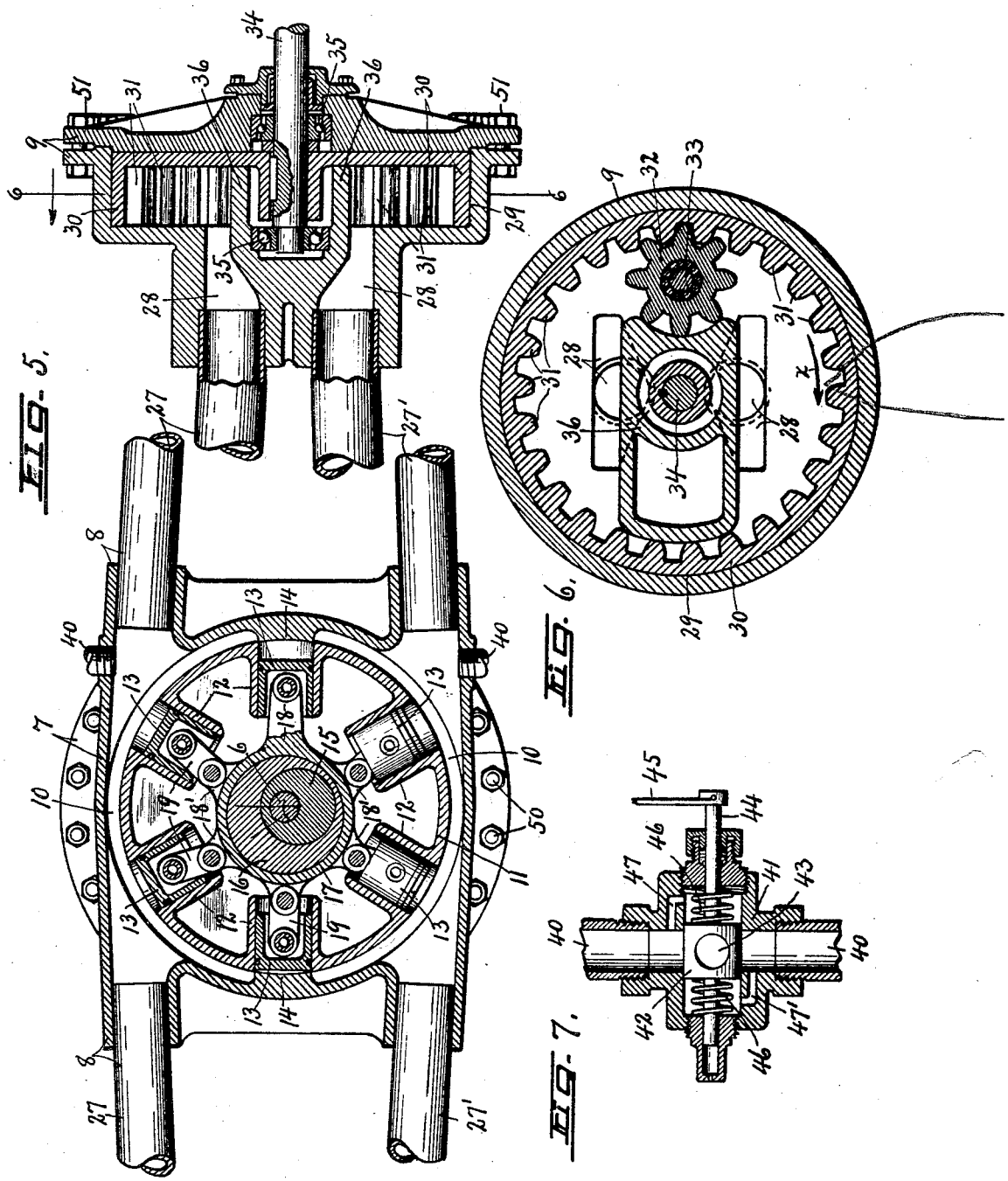

Patented Aug. 19, 1930

1,773,587

UNITED STATES PATENT OFFICE

WILLARD E. LAPE, OF SYRACUSE, NEW YORK

HYDRAULIC TRANSMISSION FOR MOTOR VEHICLES

Application filed June 10, 1924. Serial No. 719,092.

This invention relates to a hydraulic transmission mechanism for motor driven vehicles and more particularly in connection with those having internal combustion engines as the motive power.

The main object is to transmit rotary motion from the engine shaft to the traction wheels by means of a liquid such for example, as lubricating oil of low viscosity in order that it may serve the additional purpose as a lubricant for the various operating parts.

Another object is to provide simple and efficient means under the control of the operator for starting, stopping, changing the speed and reversing the direction of rotation of the traction wheels through the medium of a single control lever operated from the driver's position.

A further object is to enable the speed to be changed from zero to maximum in either direction through negligible or widely variable gradations in which the torque varies inversely as the speed and is therefore, greatest when starting or at slowest possible speeds so that the speed may be varied directly as the amount and velocity of the oil is circulated through the conducting system.

A still further object is to control this circulation through the medium of a pump actuated by the engine and to provide means for varying the stroke of the pistons of the pump from a neutral or "no stroke" position to the maximum stroke provided for so that when the pistons are adjusted to the neutral position, no circulation will take place and will positively prevent movement of the car in either direction thereby reducing the liability of theft and affording simple and convenient means for controlling the speed and momentum of the vehicle.

Other objects and uses relating to specific parts of the transmission mechanism will be brought out in the following description.

In the drawings:—

Figure 1 is a top plan of a chassis of a motor vehicle having an internal combustion engine as the motive power and showing the compact relation of the hydraulic mechanism for transmitting power from the engine shaft to the traction wheels.

Figure 2 is an enlarged vertical sectional view taken on line 2—2, Figure 1.

Figure 5 is an enlarged transverse vertical sectional view taken on line 5—5, Figure 1 looking forwardly, except that portions of the liquid conduits are broken away, showing mainly the pump case and pump pistons therein and one of the rotor cases and rotors therein.

Figure 6 is a sectional view taken in the plane of line 6—6, Figure 5, and Figure 7 is an enlarged sectional view of a portion of the by-pass conduit shown in Figure 3, and the valve mechanism for controlling the passage of fluid through the by-pass.

Figure 3:
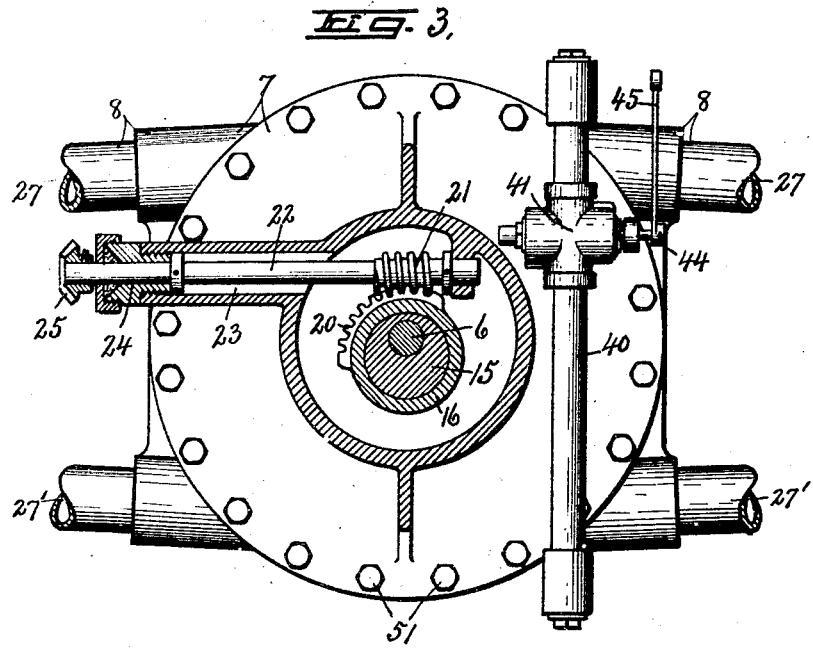
Figure 3 is a sectional view taken in the planes of line 3—3, Figure 2, except that the by-pass pipe connecting the lower and upper sides of the pump case is shown in elevation.

The chassis of the vehicle may be of any suitable construction consisting, in this instance, of opposite frame bars —1— mounted upon front and rear supporting wheels —2— and —3— and carrying at its front end, a motor such as an internal combustion engine —5— having a suitable drive shaft —6— extending rearwardly to a pump case —7— which incloses the adjacent ends of the rear axle sections —8—.

The body-supporting frame of the chassis may be mounted in the usual manner upon suitable supporting springs not shown but ordinarily carried by the front and rear axles while the front wheels may also be connected to the front axle in such manner as to permit steering of the machine by any suitable steering mechanism not necessary to herein illustrate or describe.

The outer ends of the axle sections —8— just inside of the wheels are journaled in suitable rotor casings —9— which in turn may be operatively connected to the supporting springs for the chassis frame in any suitable manner to hold them against rotation.

The pump case —7— is provided with a chamber —10— for receiving a rotary spider —11— which is keyed or otherwise secured to the rear end of the drive shaft —6— to be actuated thereby and is provided with a plurality of, in this instance six, radial cylinders —12— containing a corresponding number of pistons —13— reciprocally movable radially therein.

The periphery of the spider —11— is circular and concentric with the axis of the drive shaft —6— while the major portion of the chamber —10— is also cylindrical and concentric with the axis of the spider —11— but is of slightly greater diameter than the spider except the diametrically opposite sides.

The casing —7— is provided with inwardly projecting ribs —14— having curved inner faces concentric with said axis and in close proximity to the periphery of the spider —11— to form substantially liquid-tight joints with said periphery without interfering with the free rotation of the spider.

The object of these ribs is to cut off direct communication between the lower and upper sides of the chamber —10— and thereby to prevent the direct passage of the fluid from one side to the other, as will be hereinafter more fully described.

The rear end of the pump case —7— is provided with a forwardly projecting cylindrical hub —15— eccentric to the shaft —6— and in which the rear end of the shaft is journaled.

A sleeve —16— is journaled upon the periphery of the hub —15— for rotary or angular adjustment about the axis of said hub.

The distances between the axis of the relatively stationary hub —15— and the axes of the sleeve —16— and drive shaft —6— are substantially equal so that when the sleeve —16— is adjusted angularly about the axis of the hub —15—, its axis may be shifted into and out of registration or coincidence with that of the drive shaft for varying the stroke of the pistons —13— in a manner presently described.

The front end of the sleeve —16— is provided with a circular bearing concentric with the axis of said sleeve and upon this circular bearing is mounted a ring —17— having a plurality of radial arms —18— and —18'—, one for each piston, one of said radial arms as —18— being rigidly connected to the ring and constituting a pitman having its outer end pivotally connected to the corresponding piston —13—.

The remaining arms —18'— are connected by pitmen —19— to their respective pistons and together with the rigid pitman —18— constitute the means for imparting reciprocatory movement to said pistons as the cylinders with the pistons therein together with the ring —17— are rotated upon the eccentric sleeve —16— by the rotation of the drive shaft —6—.

Any suitable means may be provided for effecting the angular adjustment of the sleeve —16— to vary the stroke of the pistons and for this purpose, the rear end of said sleeve is provided with a worm gear segment —20— concentric with its axis and engaged by a rotary worm —21— on a laterally extending tangential shaft —2—.

This shaft is extended laterally through a tangential opening —23— in one side of the pump case —7— and is journaled in a suitable gland —24— in the outer end of said opening, the outer end of the shaft being connected by bevel gears —25— to a forwardly extending operating shaft —26— as shown more clearly in Figures 1 and 3.

The forward end of the shaft —26— for adjusting the eccentric —16— may be provided with suitable means not shown within easy reaching distance of the driver by which it may be turned to effect the desired stroke or neutral position of the pistons while the machine is in operation.

The bearing —16— for the pitman ring —17— is eccentric to the axis of the stationary bearing —15— while the axis of the shaft —6— is disposed in the arc of movement of the axis of the bearing —16— which permits the axis of said bearing member —16— to be adjusted into and out of coincidence with that of the shaft as and for the purpose previously explained.

That is, when these axes are coincident, the pitman ring —17— will merely revolve around the axis of the shaft without imparting any reciprocatory movement to the pistons and thereby preventing the circulation of the impelling fluid through the rotors.

On the other hand, by shifting the eccentric —16— to bring its axis to either side of the axis of the shaft —6— will cause more or less reciprocatory movement of said pistons according to the angle of adjustment.

The opposite ends of the upper half of the chamber —10— are connected by oppositely extending pipes —27— to the upper halves of the corresponding rotor cases —9— while the opposite ends of the lower half of the chamber —10— are connected by oppositely extending pipes —27'— to the lower halves of the corresponding rotor casings —9— as shown more clearly in Figure 5 except that one of the rotor casings is omitted.

The inner ends of the pipes —27— and —27'— are tightly and permanently secured in suitable openings in opposite ends of the pump case —7— to form liquid and air-tight joints therewith while their outer ends are similarly secured in vertically spaced openings —28— in the inner ends of the rotor casings —9— to form liquid and air-tight joints.

The pump case —7— and parts mounted therein constitute what may be termed a combined differential, speed changing and forward and reverse power transmitting mechanism, the pump case —7—, pipes —27— and —27'— and rotor cases —9— forming the rear stationary axle and also a part of the circulatory system for the oil or other propelling fluid.

The rotor casings —9— are provided with enlarged annular chambers —29— for receiving suitable liquid impelled rotors —30— which are preferably cup-shaped and arranged with their open sides facing the openings —28— and are provided with internal gear teeth —31— constituting the wings or veins for receiving the impact of the circulating fluid.

Figure 4:
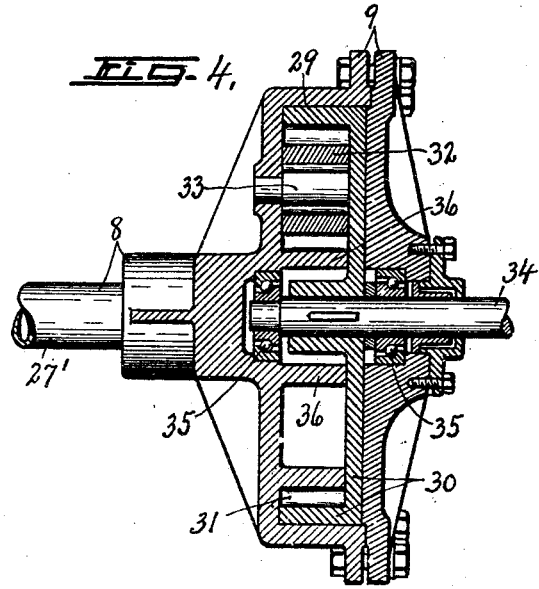
Figure 4 is an enlarged longitudinal sectional view of one of the rotor cases and the liquid-impelled rotors therein showing also the adjacent end of one of the rear axle sections upon which they are mounted.

These internal teeth are arranged in uniformly spaced relation in the form of a gear and mesh with the teeth of suitable pinions —32— which in turn are journaled on studs —33— on the casing —9— as shown in Figures 4 and 6.

The traction wheels —3— may be of any desired construction and removably, but rigidly secured to the outer ends of a pair of rotary axle sections —34— which are centrally journaled in suitable bearings —35— in the inner and outer walls of the adjacent rotor casings —9— as shown in Figures 4 and 5, and also extend centrally through and are keyed or otherwise secured to and within the center hub of the corresponding rotors —30—, whereby the rotation of said rotors in either direction will impart similar rotary movement to the axle sections —34— and their respective wheels —3— for propelling the machine either forwardly or backwardly according to the direction of rotation of the rotors.

The inner walls of the rotor chambers —29— are provided with radially extending partitions —36— between the openings —28— and separating the corresponding pairs of openings one from the other, said partitions being extended around the hubs of their respective rotors —30— into close proximity to the inner faces of the outer end walls thereof to form liquid-tight joints therewith and also serve to receive and support the inner bearings —35— for the axle sections —34—.

These partitions —36— extend forwardly into close proximity to the inner faces of the gear teeth —31— to form liquid-tight joints therewith, without interfering with the free rotation of the rotors which are provided with circular peripheries running in close proximity to the peripheral walls of the casings —9— to form liquid-tight joints therewith.

The pinions —32— are preferably located between the rear ends of their corresponding partitions —36— and the adjacent sides of the rotors —30— and travel in close proximity to the rear ends of said partitions to form liquid-tight joints therewith.

It is now evident that if the rotor impelling fluid is circulated through the passages provided therefor by the action of the pistons —13— whereby said fluid will be placed under pressure at one side of the partition —36— and pinions —32—, and withdrawn from the opposite sides of said partitions and pinions, the rotors will be rotated in one direction toward the side of lowest pressure by pressure of the fluid on the high pressure side of the intermeshing teeth of the gears and pinions.

For example, assuming that the engine shaft —6— and pump cylinder are driven in a counter clockwise direction Figure 5 and that the eccentric sleeve —16— is adjusted to bring its axis at the left hand side of the axis of said shaft, as shown in Figure 5, then the left hand piston —13— will be at the extreme limit of its outward movement in alinement with the adjacent partition —14— while the right hand piston will be at the extreme limit of its inward stroke and the outer end of its cylinder will be covered by the adjacent partition —14— under which conditions, the pistons above the shaft —6— will be moving outwardly from the axis of said shaft while the pistons below the shaft will be moving inwardly.

This outward movement of the uppermost pistons will operate to force the oil or other impelling fluid from the upper side of the pump chamber 10 through the corresponding passages —27— and —28— into the upper portion of the rotors —30— for rotating said rotors in the direction indicated by arrow —x—, Figure 6, and thence returning from the lower half of the rotors through the corresponding passages —28— and —27'— into the chambers of the receding pistons so that as soon as the several pistons register with the left hand partition —14—, Figure 5 and pass beyond said partition, the oil contained in their respective cylinders will be again expelled by the outward movement of the pistons, thus completing one cycle of operation which is repeated for continuously rotating the rotors —30— and axle sections —34— together with the traction wheels —3— in the same direction for propelling the machine forwardly.

Now, if the eccentric sleeve —16— is adjusted to bring its axis into registration with that of the driving shaft —6—, it is evident that there will be no reciprocatory motion of the pistons and consequently no forcible circulation of the impelling fluid to the rotors through the passages previously described.

On the other hand, if the eccentric sleeve —16— is adjusted rotarily to bring its axis at the right hand of the axis of the driving shaft —6— while the pump cylinder —11— is rotated in the same direction or counter-clockwise, Figure 5 the direction of flow of the impelling fluid through the circulating system to the rotors and return to the pump will be reversed thereby reversing the direction of movement of the traction wheels and machine propelled thereby.

It is also evident from the foregoing description that the force of circulation of the impelling fluid is dependent upon the length of stroke of the pistons and that this stroke may be varied from zero to maximum as determined by the adjustment of the eccentric sleeve —16—, thereby regulating the speed of rotation of the rotors —30— and traction wheels propelled, thereby, and at the same time permitting differentiation of the speed of rotation of said rotors as for example, in turning corners without interrupting the circulation of the fluid.

These operations are true for either forward or reverse drive, the degree of speed and direction of motion of the machine being controlled entirely by the adjustment of the eccentric member —16— which in turn may be controlled by a single controlling member connected to the shaft —26— and placed within convenient reaching distance of the driver of the machine.

Suitable means is provided for permitting local circulation of the impelling fluid from one side to the other of the pump chamber to prevent excessive pressure of the fluid in the circulating system in case the eccentric sleeve —16— should be suddenly shifted from either extreme position to a neutral position while the machine is moving under its own momentum and for this purpose is provided a by-pass conduit —40—, Figures 2, 3 and 7 having its opposite ends connected to the lower and upper half of the pump chamber —10—, Figure 5, and its intermediate portion provided with a valve case —41— in which is mounted, a rotary and axially movable valve —42—.

This valve normally closes the passage through the conduit —40— but is provided with a diametrical opening —43— therethrough adapted to be moved into registration with the passage in the conduit for permitting the local circulation of the impelling fluid therethrough from one side to the other side of the chamber —10— in case the eccentric member —16— should be suddenly moved to a neutral position while the machine is in motion.

This valve may be adjusted at will or through the medium of any suitable connections with the shifting means for the eccentric sleeve —16— and for this purpose is mounted on a shaft —44— extending through one end of the valve case —41— and provided at its outer end with an operating member —45—, Figure 7.

Or, the valve may be mounted to operate automatically and for this purpose, is movable endwise in its chamber against the action of opposed coil springs —46— which yieldingly hold it in registration with the passage through the pipe —40— but permits it to be moved endwise to open said passage.

In order to permit this automatic operation, one end of the valve chamber is connected by a branch passage —47— to the main passage in the pipe —40— at one side of the valve while the other end of the chamber is connected by a branch passage —47'— to the main passage at the opposite side of the valve as shown in Figure 7, so that the fluid under excess pressure at one side of the valve will pass through the adjacent branch passage —47— and —47'— into the corresponding end of the valve chamber and will therefore force the valve endwise to open the main passage and permit the circulation of the fluid therethrough.

The pump cylinder —11— is fitted to revolve freely in the pump case —7— and to form liquid-tight joints therewith which may be increased by the use of suitable packing rings —49—, Figure 2, in which it will be observed, the end walls of the pump case are removable but are normally clamped tightly in place by suitable bolts —50— thus permitting access to the interior mechanism for repairs or replacements when desired.

In a similar manner, one end wall of each of the rotor casings —9— is removable, but is normally held in place by bolts —51—, Figure 5.

I claim:

1. In hydraulic transmission for motor vehicles, an axle frame comprising a pump case having each of its opposite ends provided with a pair of ports, tubes secured to and extending laterally in opposite directions from said ports, rotor casings arranged in spaced relation to and at opposite ends of the pump case and each provided with a pair of ports in which the adjacent ends of the corresponding tubes are secured, wheel-supporting axles journaled in said rotor casings, engine-driven means within the pump case for circulating a fluid through said ports and tubes, and rotors secured to said axles within their respective rotor casings and actuated by the circulation of fluid through the ports of said casings, said pump case and the rotor casings being arranged in the vertical plane of the axis of the wheel-supporting axle.

2. In hydraulic power transmission for motor vehicles, an axle frame comprising a pump case having a pair of ports leading from opposite ends of its pressure side and an additional pair of ports leading from opposite ends of its suction side, a pair of tubes secured to and leading in opposite directions from the pressure ports, an additional pair of tubes secured to and leading in opposite directions from the suction ports, rotor casings at opposite ends of the pump case in spaced relation and each provided with a pressure port and a suction port connected respectively to the adjacent ends of the corresponding pressure tube and suction tube, a motor-driven rotary pump within the pump case for circulating a liquid through the pressure tubes and rotor cases and return through the suction tubes, and rotors in said casings actuated by the circulation of the liquid, said pump case and the rotor casings being arranged in the vertical plane of the axis of said rotors and the respective pairs of tubes being disposed at equal distances either side of said axis.

3. In hydraulic transmission for motor vehicles, an axle frame comprising a pump case, rotor casings at opposite ends of the pump case in spaced relation thereto, upper and lower sets of tubes connecting the pump case and rotor casings, wheel-supporting axles journaled in the outer ends of the rotor casings, a motor-driven pump within the pump case for circulating a liquid through one set of tubes to the rotor casings and return through the other set of tubes to the pump case, and rotors within said casings actuated by the circulation of the liquid, said pump case and the rotor casings being arranged in the vertical plane of the axis of said wheel-supporting axles and the respective tubes of each set being spaced equal distances either side of said axis.

4. Hydraulic transmission as in claim 3 including a by-pass connecting the pressure and suction sides of the pump, a rotary piston valve having an opening therethrough and yieldingly held against axial movement, means for rotating the valve to bring the opening into and out of registration with the by-pass for opening and closing said by-pass and branch passages leading from the by-pass at opposite sides of the valve to the valve chamber at opposite ends of the valve for opening said valve in case of excess liquid pressure at either side of the valve.

5. In hydraulic transmission for motor vehicles having opposite coaxial driving wheels, an axle frame comprising a pump case midway between the wheels and having a circular pump-chamber divided into lower and upper compartments, rotor-casings adjacent the driving wheels and provided with journal bearings therefor, said casings having circular rotor-chambers divided into lower and upper compartments, pipes connecting the lower compartments of the pump case and rotor casings, additional pipes connecting the upper compartments of said case and casings, a motor-driven pump in the pump case for circulating a liquid through one set of pipes and return through the other set of pipes, and rotor in the rotor-casings actuated by the circulation of the liquid through the compartments of the casings and operatively connected to the driving wheels for rotating the same, said pump case, the rotor casings and the pipes connecting the pump case with said motor casings being arranged in the vertical plane of the axis of the driving wheels with the upper and lower pipes disposed at equal distances either side of said axis.

6. Hydraulic transmission means as in claim 5 including manually operated means for adjusting parts of the pump to vary the volume and direction of the circulation of the liquid.

In witness whereof I have hereunto set my hand this 29th day of May, 1924.

WILLARD E. LAPE.